Jan. 7, 1958
C. H. NIMS
2,818,984
HOIST AND TOWING EQUIPMENT
Filed April 2, 1956
2 Sheets-Sheet 1
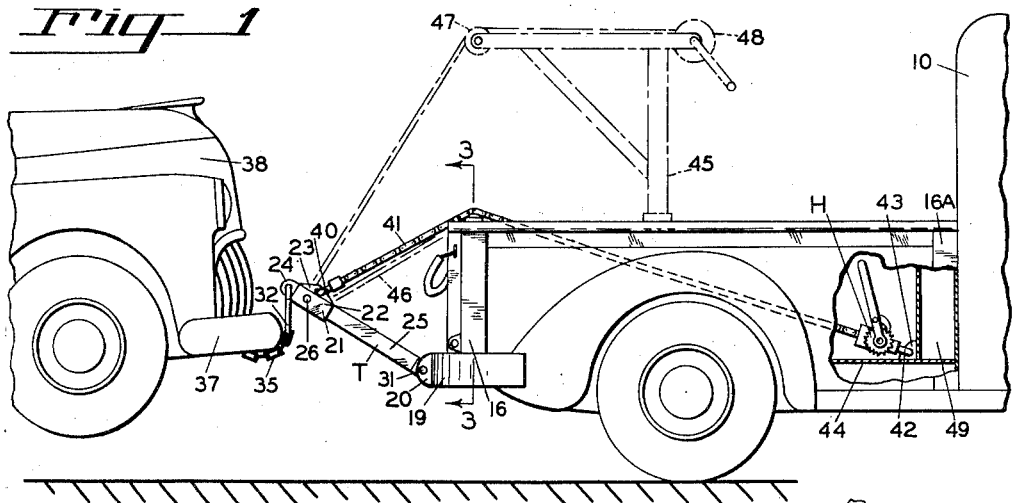
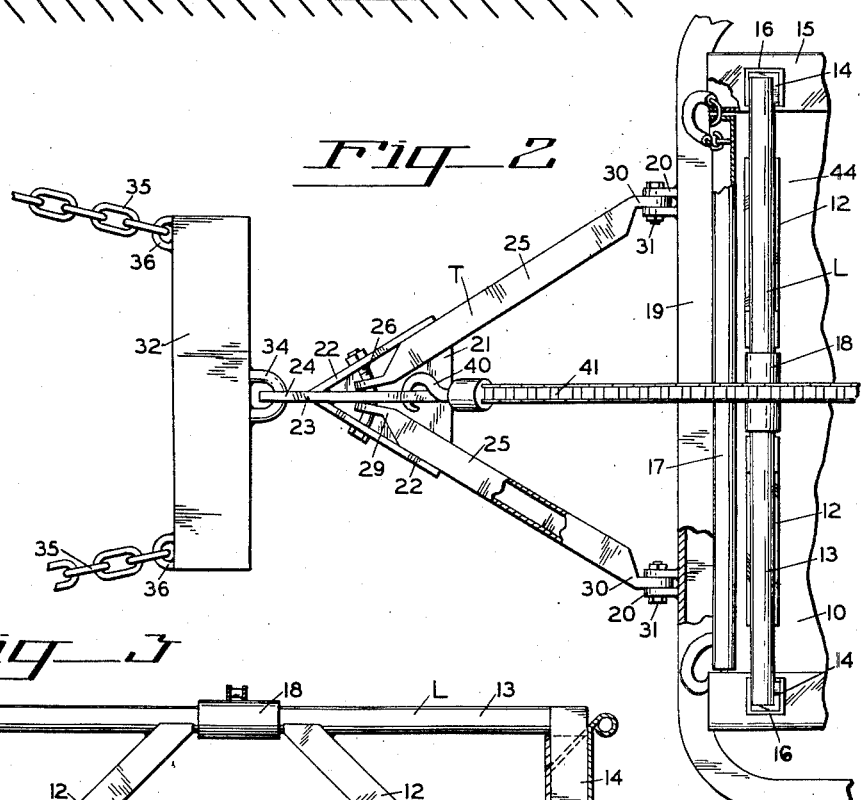
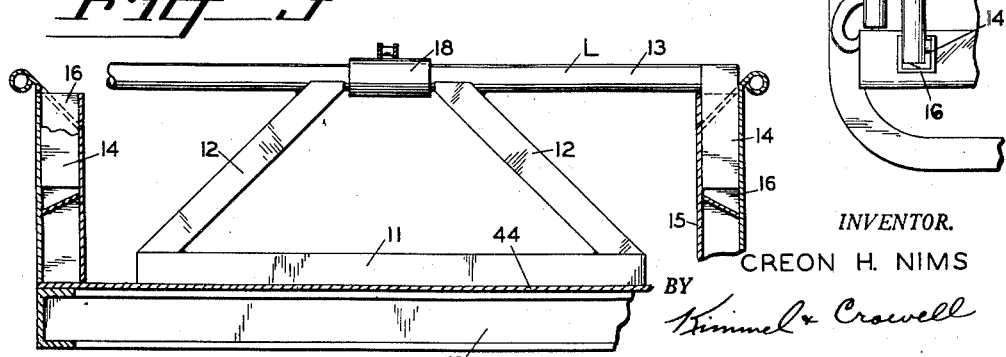
INVENTOR.
CREON H. NIMS
BY
Kimmel & Crowell
ATTORNEYS Jan. 7, 1958   C. H. NIMS   2,818,984
HOIST AND TOWING EQUIPMENT
Filed April 2, 1956   2 Sheets-Sheet 2
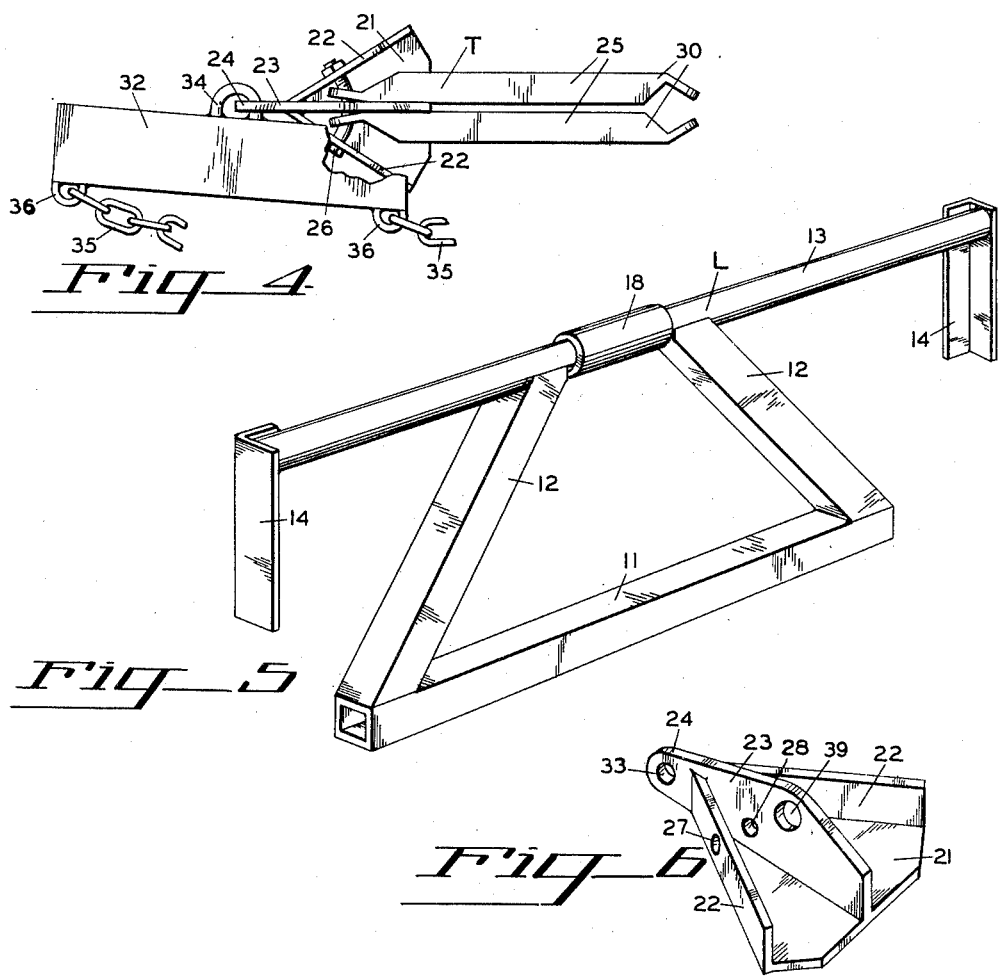
INVENTOR.
CREON H. NIMS
BY
Kimmel & Crowell
ATTORNEYS United States Patent Office 2,818,984
Patented Jan. 7, 1958

2,818,984

HOIST AND TOWING EQUIPMENT

Creon H. Nims, Portland, Oreg.

Application April 2, 1956, Serial No. 575,546

3 Claims. (Cl. 214—86)

The present invention relates to hoists and towing equipment, and more particularly to such equipment that is adapted to be used with ordinary pickup trucks for towing other vehicles.

The primary object of the invention is to provide towing equipment that can be stored in a pickup truck and erected within the body of the truck so that vehicles can be towed by the pickup truck.

Another object of the invention is to provide towing equipment of the class described above that is simple of construction and can be stored in a small space within the pickup truck.

A further object of the invention is to provide towing equipment that can be applied to the tow truck with a minimum amount of tools.

Other objects and advantages will become apparent in the following specification when considered in the light of the attached drawings, in which:

Figure 1 is a fragmentary side elevation of a pickup truck with the towing equipment installed therein and towing a vehicle.

Figure 2 is a fragmentary plan view of the rear end of the pickup truck and towing equipment shown with the spreader bar in horizontal position.

Figure 3 is a fragmentary transverse cross-section taken on the line 3—3 of Figure 1, looking in the direction of the arrows.

Figure 4 is a plan view of the tow bar assembly in folded position ready for storage.

Figure 5 is a perspective view of the load supporting unit assembly of the invention.

Figure 6 is a perspective view of the basic frame member of the tow bar unit.

Referring now to the drawings in detail wherein like reference numerals indicate like parts throughout the several figures, the reference numeral 10 indicates a conventional pickup truck used in the operation of my new and improved hoist and towing equipment. The towing equipment consists of a load supporting unit L, a tow bar unit T, including a hoisting device H. The load supporting unit L, referring to Figure 5, consists of a base 11, having a pair of A-frame forming supports 12 for supporting a transverse load supporting member 13. The member 13 is preferably formed of round stock. Affixed to the ends of the load supporting member 13 are legs 14.

Referring now particularly to Figures 2 and 3, the truck body 15 usually has vertical hollow stake supports 16 located adjacent its tail gate 17, and also on the forward end, as indicated at 16A. These hollow vertical stake supports 16 are adapted to receive the legs 14 depending from the load carrying bar 13. This holds the load carrying unit L in a vertical position within the rear of the body 15 of the tow truck 10 while in use. When the load carrying unit L is not being used in towing operation, it is moved from the hollow stake supports 16 on the rear of the body 15 of the truck 10 to the hollow stake supports 16A located on the forward end of the body 15 just behind the cab of the truck 10 for storage.

The main weight of the load to be supported coming upon the A-frame supports 12 and the base 11.

Rotatably mounted to the cross member 13 is a sleeve 18 which is adapted to support the load carrying chains or cables 41, which will be later described. The truck 10 has a rear bumper 19 provided with spaced pairs of ears 20 formed thereon.

The tow bar unit T consists of a body member 21, which is V-shaped in form, referring to Figure 6 particularly, having upturned side walls 22 forming part thereof. The member 21 also has a backbone member 23 forming part thereof and extending forwardly at 24.

Referring particularly to Figures 1, 2 and 4, draw bars 25 are pivotally mounted to the body member 21 by a curved king pin 26, which passes through holes 27 of the side members 22 and holes 28 through the backbone member 23.

When the tow bar unit T is being used, the bars 25 are in the position shown in Figures 1 and 2, the forward ends 30 are connected to the ears 20 by the bolts 31. This gives a relatively rigid tow bar unit T. A transverse evener bar 32 is pivotally connected to an opening 33 in the end of the backbone 23 of the member 21 by a connection 34 forming part of the transverse bar 32. Chains 35 are pivotally connected at 36 to the ends of the bar 32 and are adapted to pass under bumper 37 of a vehicle 38 being towed, fastening in the usual manner to the framework of the vehicle.

Connected to a hole 39 of the backbone 23 of the tow bar unit T is a hook 40, which is fixedly secured in this instance to a chain 41. The chain 41 is trained over the sleeve 18 of the supporting transverse bar 13 of the load supporting unit L and connects to the winch H. In this case a hand operated winch is illustrated, but it could be of any suitable design.

The winch H is anchored at a suitable location within the body 15 of the tow truck 10 to an ear 43, which is secured to a solid frame member beneath the body 15. Broken lines 45 indicate the usual hoisting derrick mounted on many of this type of truck 10, which can be used to raise the tow bar unit T to the position shown in Figure 1, in lieu of the winch H. In this case a cable 46, indicated by broken lines is connected to the cross member 13 and travels around a pulley, not here shown, located in the frame member 21 and pulled over the usual pulley 47 of the hoisting device 45 by the usual hand winch 48.

A storage box 49 may be provided within the truck 10 for storing the towing equipment T while not in use.

In the operation of this device, the load supporting unit L is transferred from the storage box 49 to a position with its legs 14 within the vertical hollow frame members 16 and its base 11 coming to rest on the bed 44 of the tow truck 10, as best illustrated in Figures 2 and 3.

The tow bar unit T is then unfolded from the position shown in Figure 4 and secured to the ears 20 by the bolts 31, referring to Figure 2. The tow chains 35 can then be applied to the vehicle 38 to be towed. The chain 41, with its hook 40 is then hooked into the hole 39 of the tow bar frame 21, the opposite end of the chain 41 is placed over the sleeve 18 of the supporting cross bar 13 and affixed to the winch H, after which the winch H can be operated by its operating lever, raising the tow bar unit T to the position shown in Figure 1, together with the vehicle 38 being towed. The weight of the vehicle 38 being supported by the load supporting unit L.

Having thus described the preferred embodiment of the invention, it should be understood that numerous modifications and structural adaptations may be resorted to without departing from the scope of the appended claims.

What is claimed is:

1. A hoisting and towing attachment for a pickup truck of the type having vertically opening stake pockets formed in the rear end portions of the sides thereof and a horizontally rear bumper cross member secured thereto, comprising, a pair of bars, means pivotally and detachably securing the forward ends of said bars to said cross member in laterally spaced relation, means connecting the rear ends of said bars, means carried by said last-named means for connection to a towed vehicle, a beam extending transversely of the rear end of said truck, means on opposite ends of said beam engaging in said stake pockets for positioning said beam, means depending from said beam engaging said truck to support said beam, a roller journalled medially on said beam, a flexible connector having one end secured to said means connecting said bars, said connector extending forwardly and being trained over said roller, and means on said truck connected to the forward end of said flexible connector for pulling said connector and raising said bars.

2. A device as claimed in claim 1 wherein said bars converge rearwardly and said bars are pivotally secured to said means connecting said bars thereby permitting said bars to be folded together for storage when detached from said cross member.

3. A device as claimed in claim 1 wherein said means engaging in said stake pockets comprises a pair of depending stub stake member arranged in parallel relation on opposite ends of said beam.

References Cited in the file of this patent

UNITED STATES PATENTS

| | | |
|---|---|---|
| 1,498,151 | Butler | June 17, 1924 |
| 1,512,429 | Loudon | Oct. 21, 1924 |
| 2,283,443 | Klein | May 19, 1942 |
| 2,555,663 | Schouboe | June 5, 1951 |
| 2,617,628 | Wagner | Nov. 11, 1952 |
| 2,712,877 | Wiley | July 12, 1955 |